Patented Apr. 21, 1936

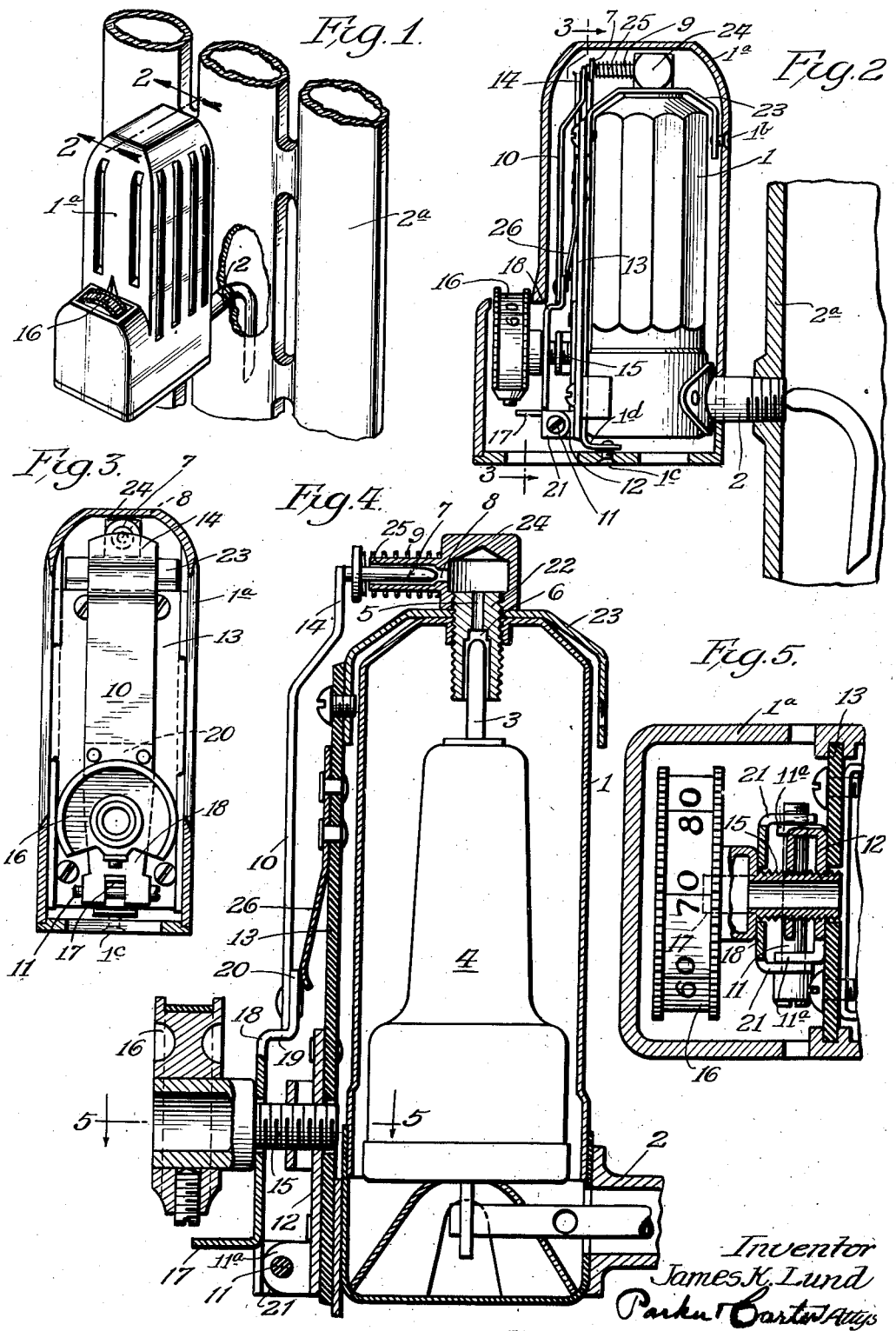

2,038,435

UNITED STATES PATENT OFFICE 2,038,435

RADIATOR CONTROLLING DEVICE

James K. Lund, Chicago, Ill., assignor to The Dole Valve Company, Chicago, Ill., a corporation of Illinois Application August 31, 1932, Serial No. 631,168

15 Claims. (Cl. 236—63)

This invention relates to radiator controlling devices and has for its object to provide a new and improved device of this description. The invention has as a further object to provide a radiator controlling device which has means for closing the valve in response to steam or water, and an additional control responsive to room temperatures for controlling the discharge of the air therefrom. The invention has as a further object to provide a radiator controlling device with means, responsive to temperatures of the apartment to be heated, for controlling the air valve. The invention has as a further object to provide a radiator controlling device which acts in response to steam or water entering it, and to add to this controlling device means responsive to room temperatures for controlling the air escaping therefrom. The invention has as a further object to provide a controlling device for automatically controlling the individual radiators of a heating system, each being controlled independent of the other and of the system, and responsive to the temperature of the apartment in which the radiator is located. The invention has other objects which are more particularly pointed out in the accompanying description.

Referring now to the drawing, Fig. 1 is a view showing one form of device embodying the invention in position on a radiator;

Fig. 2 is a sectional view through the cover, taken on line 2—2 of Fig. 1, showing the valve parts therein;

Fig. 3 is a sectional view taken on line 3—3 of Fig. 2;

Fig. 4 is a central vertical sectional view through the valve and associated parts, with the cover removed;

Fig. 5 is a sectional view taken on line 5—5 of Fig. 4.

Like numerals refer to like parts throughout the several figures.

Referring now to the drawing, I have shown a radiator controlling device adapted to be connected to a radiator, and which consists of a casing 1 divided into an upper and a lower section fastened together and having a connecting element 2 by means of which the casing 1 is connected with the radiator 2a. Within the casing 1 is a valve 3 which is connected with a follow float 4, which float is provided on the interior with a fluid which expands under heat. The valve 3 controls a passageway 5 leading from the casing 1 by seating upon a seat 6. When there is no steam or water in the casing 1, the valve 3 is open to permit the escape of air through the passage 5. If water enters the casing 1, the float 4 is lifted so as to move the valve 3 to its seat and close the discharge from the casing 1. When steam enters the casing 1, the fluid in the float expands so as to cause the valve 3 to be seated to close the passageway 5. On the exterior of the casing 1 is a valve member 7 which controls a passageway 8 leading from the casing 1 to the external atmosphere. This valve is moved to its open position by a spring 9. The valve is moved to its closed position by a thermostatic device, responsive to the temperature of the atmosphere of the room to be heated.

As herein shown, a thermostatic member 10 is pivotally connected at 11 with the lugs 11a of a support 12, connected with a heat insulating member 13 attached to the valve casing 1. The upper end 14 of the thermostatic member 10 engages the end of the valve member 7. The thermostatic member 10 is shielded from the heat of the radiator and of the casing 1 by the heat insulating member 13 so that it is substantially responsive to the temperature of the apartment to be heated, and is arranged so that when the temperature of the apartment to be heated reaches a predetermined point, the thermostatic member 10 will be moved so as to engage the valve member 7 and move it to its closed position, thereby shutting off the escape of air from the valve casing 1 and the radiator. It will be noted that the valve 7 is preferably entirely disconnected from the thermostatic member 10, this member simply engaging the end thereof in its action to move the valve to its closed position.

Some means is provided for adjusting the thermostatic member 10 so that it will shut off the valve 7 at different room temperatures, thereby permitting the room to be heated to different temperatures. This adjusting device may be of any suitable construction, and is arranged to move the thermostatic member 10 toward or away from the valve 7. In the construction shown, an adjusting member 15, which is preferably a screw, is arranged between the thermostatic device and a stationary part, such as the insulating member 13, so that when rotated in one direction it moves the thermostatic member 10 outwardly, and when rotated in the other direction it moves the thermostatic member inwardly. This screw is controlled by a hand piece 16 which is preferably semi-circular in form, or at least something less than a circle, and which has graduations thereon showing the degree of heat. A limiting device 17 is provided which is engaged by the hand piece 16 so as to limit its rotation in either direction. In the particular construction illustrated the thermostatic member 10 is made of suitable thermostatic metal, and I prefer to form it in two pieces, 10 and 18. The section 18 is bent so as to form a shoulder 19 and an end 20, and the member 10 is arranged to abut the shoulder 19 and is fastened to the end 20, as clearly shown in Fig. 4. The section 18 is provided with lugs 21 through which the pivot 11 passes.

In the particular construction illustrated the passageway 5 and the seat 6 are formed in a separate piece 22 which projects from the upper end of the casing 1. The insulating piece 13 is provided with a supporting member 23 which has an opening through which the end of the piece 22 projects, as clearly shown in Fig. 4. Connected with this upper end of the piece 22, by screw threads or otherwise, is a hollow member 24 carrying the valve seat 8 for the valve 7. The member 24 has a projection 25, preferably in the form of a small tube, into which the valve 7 is received, the end of this valve being enlarged and projecting from the tube 25. This tube acts as a support for the valve 7 and also as a support for the spring 9. A spring 26 is also provided, tending to move the thermostatic device outwardly.

The pivotal connection of the thermostat 10 to its support is for the purpose of making adjustment of the thermostat by means of the screw 15. It will further be seen that the thermostat is directly connected to the insulating member and that the insulating member is removably supported on the casing 1 of the valve. It will further be seen that the valve casing 1 is supported on the radiator in the ordinary way. It will be seen that the thermostat 10 and the insulating member 13 is a separate unit from the valve casing 1 and the valves 3 and 4 therein, and that it may be easily and quickly applied to the valve casing by placing the supporting member 23 over the part 22. The member 24 is then placed in position on the part 22 and arranged with the end of the valve 7 in proper position with relation to the thermostat 10. It will thus be seen that the thermostat and the insulating member 13 are not attached to the radiator but to the casing 1 of the valve, and that this attachment can be easily and quickly made.

A cover is preferably provided for covering the air valve and the separate controlling unit exterior thereto, consisting of the thermostat and the insulating shield. This cover, as herein shown, is attached to the supporting member 3 by the screw 1b and by a screw 1c to a lug 1d connected with the insulating member 13. This cover 1a is provided with openings so that the air may freely circulate therethrough in order that the thermostat 10 may be responsive to the temperature of the apartment.

In the operation of the device the float 4, having the valve 3 thereon, controls the escape of air and water and steam from the radiator during the ordinary operation of the radiator, particularly when first started up. After the radiator is in operation so as to heat the room, the thermostat 10 acts, when the room temperature reaches a predetermined point, to move the valve 7 to close the passageway 8 and prevent escape of air from the radiator. The air then accumulates in the radiator and gradually excludes the steam from the end of the radiator nearest the valve, and a portion of the radiator is thus rendered inoperative for heating purposes, the heating being confined to the portion of the radiator containing the steam. If too much of the radiator is blocked off so there is not enough of effective heating surface to heat the apartment, the thermostat 10 acts so that the valve 7 is opened to let out some of the air, and when the temperature of the room is raised the desired amount, that is to the predetermined point, the thermostat cuts off the escape of air.

It will thus be seen that this arrangement automatically controls the individual radiator so as to secure a substantially uniform temperature in the apartment heated by the radiator, and this is done by varying the amount of effective heating surface of the radiator automatically as the conditions warrant. In colder weather there would be less of the radiator blocked off with air then in warmer weather, all of which will be done automatically on the individual radiator by means of the thermostat 10 and valve 7.

I may solder the part 24 in position or I may fasten it in any other manner than that shown, to the casing. I may make it integral with the part 22. All the parts are preferably assembled and properly adjusted and then the entire device attached to the radiator by screwing the part 2 into the threaded opening in the radiator, as shown in Figs. 1 and 2.

I claim:

1. A radiator controlling device comprising an air valve having a casing divided into an upper and a lower section fastened together, a discharge passageway connecting said casing with the outside air for the escape of air therefrom, a valve in the upper section of the casing for controlling this passageway, a second valve on the outside of said casing for controlling said passageway, a thermostat on the outside of the casing for controlling said second valve, a heat insulating shield on the outside of the casing and interposed between the casting and the thermostat, the insulating shield being connected with the casing.

2. A radiator controlling device comprising an air valve having a casing, a discharge passageway connecting said casing with the outside air for the escape of air therefrom, a valve in the casing for controlling this passageway, a second valve for controlling said passageway, a thermostat on the outside of the casing for controlling said second valve, a heat insulating shield on the outside of the casing and interposed between the casing and the thermostat, the insulating shield being removably connected with the casing, a pivotal connection between the thermostat and the insulating shield, and a regulating device for moving the thermostat about said pivotal connection and with relation to said second valve to cause it to act on said second valve in response to different temperatures the axes of said regulating device and said pivot being substantially at right angles to each other.

3. A radiator controlling device comprising an air valve having a casing, a discharge passageway connecting said casing with the outside air for the escape of air therethrough, a valve in the casing for controlling this passageway, a second valve outside of the casing for controlling said passageway and located substantially at right angles to said first mentioned valve, a thermostat on the outside of the casing, said thermostat extending longitudinally along the casing, a support for said thermostat outside of the casing and extending across the top of said casing and supported thereon, said thermostat disconnected from said second valve but having part thereof in proximity thereto.

4. A radiator controlling device comprising an air valve having a casing, a discharge passageway connecting said casing with the outside air for the escape of air therefrom, a valve in the casing for controlling this passageway a valve seat therefor, a second valve for controlling said passageway a valve seat therefor, a thermostat on the outside of the casing for controlling said second valve, a heat insulating shield on the outside of the casing and interposed between the casing and the thermostat, the thermostat and insulating shield being a separate unit separate from the casing, and the said two valves seats being adapted to be removably supported on the casing.

5. A radiator controlling device comprising an air valve having a casing provided with a threaded opening, a threaded member in said opening having a passageway therethrough, a valve in said casing adapted to control said passageway, a separate hollow member adapted to be removably connected with said threaded member and forming a continuation of said passageway, a second valve in the portion of the passageway in said hollow member for controlling said passageway, a heat insulating shield on the outside of said valve casing, a supporting member connected therewith having an opening therein through which the threaded member projects, a thermostat outside of said casing and connected with said insulating shield and having one end in proximity to said second valve so as to control its position.

6. A radiator controlling device comprising two separate elements, one an air valve connected to and supported upon the radiator, the other a separate unit having all of its parts exterior to the air valve and supported thereon, said air valve having a casing made up of an upper and a lower section connected together being provided with a passageway which communicates with the exterior atmosphere through which air escapes from the radiator, said air valve having means in said upper section for controlling said passageway, said separate unit exterior to the valve being provided with a thermostat shielded from the heat of the radiator and the air valve, a second valve exterior to said air valve for controlling said passageway said thermostat directly contacting with said second valve to operate it, said second valve controlled by said thermostat, responsive to room temperature.

7. A radiator controlling device comprising an air valve having a casing divided into an upper and a lower section fastened together, an air passageway leading from the upper section of said casing, two valves controlling said passageway, one within the casing being controlled by the temperature in the casing, the other outside of the casing being controlled by the room temperature.

8. A radiator controlling device comprising an air valve having a casing divided into an upper and a lower section fastened together, an air passageway leading from the upper section of said casing, two valves controlling said passageway, one within the casing being controlled by the temperature in the casing, the other outside of the casing being controlled by the room temperature, there being means for rendering the control of the latter valve independent of the temperature in the casing.

9. A radiator controlling device comprising a heat insulating shield, a supporting member therefor extending laterally therefrom and adapted to be supported on the top of a radiator air valve, a thermostat connected with said heat insulating shield and having a valve controlling end which projects above the top of said shield.

10. A radiator controlling device comprising a heat insulating shield, a supporting member therefor extending laterally therefrom and adapted to be supported on the top of a radiator air valve, a thermostat connected with said heat insulating shield and having a valve controlling end which projects above the top of said shield, and a spring connected with said shield and engaging said thermostat.

11. A radiator controlling device comprising a heat insulating shield, a supporting member therefor extending laterally therefrom and adapted to be supported on the top of a radiator air valve, a thermostat connected with said heat insulating shield and having a valve controlling end which projects above the top of said shield, and an adjusting device for moving the upper end of said thermostat toward and away from said shield.

12. A radiator controlling device comprising a heat insulating shield, a supporting member therefor extending laterally therefrom and adapted to be supported on the top of a radiator air valve, a thermostat pivotally connected with said heat insulating shield and having a valve controlling end which projects above the top of said shield.

13. A radiator controlling device comprising a heat insulating shield, a supporting member therefor extending laterally therefrom and adapted to be supported on the top of a radiator air valve, a thermostat pivotally connected with said heat insulating shield and having a valve controlling end which projects above the top of said shield, and an adjusting device for moving said thermostat about its pivotal connection.

14. A radiator controlling device comprising a heat insulating shield, a supporting member therefor extending laterally therefrom and having an opening therein, an air valve having a casing with a valve member projecting through said opening in said supporting member, a second valve member connected with said first valve member, a valve carried thereby, a thermostat connected with said heat insulating shield and having one end projecting thereabove and in controlling engagement with said valve.

15. A radiator controlling device comprising a heat insulating shield, a supporting member therefor extending laterally therefrom and having an opening therein, an air valve having a casing with a valve member projecting through said opening in said supporting member, a second valve member connected with said first valve member, a valve carried thereby, a thermostat connected with said heat insulating shield and having one end projecting thereabove and in controlling engagement with said valve, an adjusting device for moving the end of said thermostat in proximity to said valve toward and from said insulating shield.

JAMES K. LUND.